Figure 1:
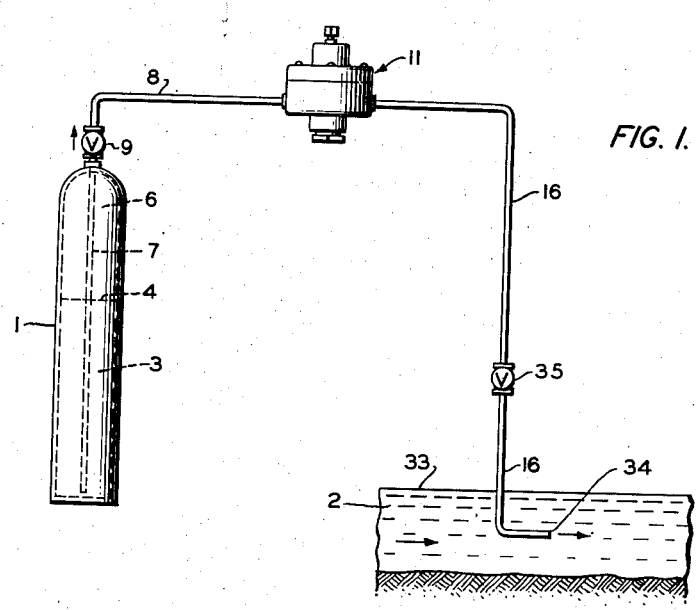

July 27, 1954

E. E. RUSH 2,684,838

PROCESS OF DISPENSING A SOLUBLE FLUID TO
A LIQUID AND SYSTEMS AND VALVES FOR
PRACTICING SAID PROCESS

Filed Jan. 2, 1952

2 Sheets-Sheet 1

INVENTOR.
E. E. RUSH
BY Hudson & Young
ATTORNEYS

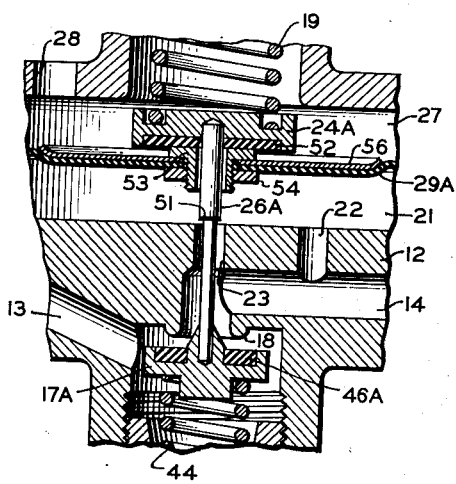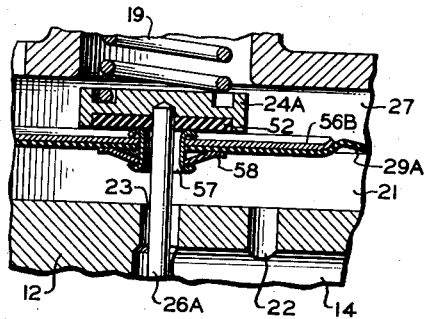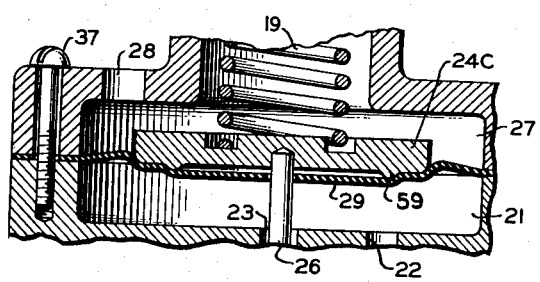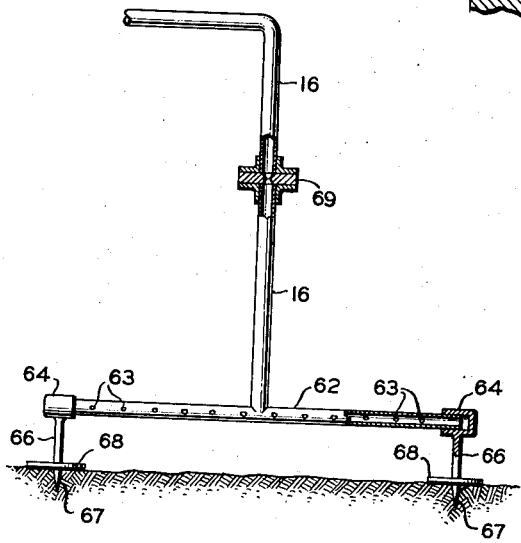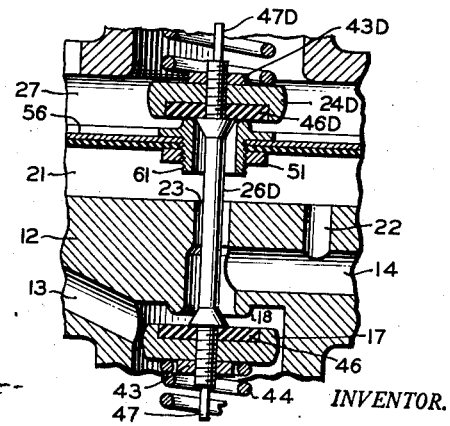

Patented July 27, 1954

2,684,838

UNITED STATES PATENT OFFICE 2,684,838

PROCESS OF DISPENSING A SOLUBLE FLUID TO A LIQUID AND SYSTEMS AND VALVES FOR PRACTICING SAID PROCESS

Elton Earl Rush, Bartlesville, Okla., assignor to Phillips Petroleum Company, a corporation of Delaware Application January 2, 1952, Serial No. 266,838

14 Claims. (Cl. 261—121)

This invention relates to the process of dispensing a fluid from a pressure source into a stream of liquid in which it is soluble. In another aspect it relates to a novel system for practicing this process. In another aspect it relates to a pressure regulating valve useful in such processes. In another aspect it relates to a pressure regulating valve for a source of fluid under pressure having a vacuum breaker incorporated therein, said vacuum breaker being called a vacuum relief valve. It also relates to metering fluids.

In the prior art of dispensing a fluid from a pressure source of the same into a stream of liquid in which it is soluble below the surface of said liquid, at a constant pressure, considerable difficulty has been experienced in that when the source of pressure is exhausted, the liquid in contact with the fluid continues to absorb the same, creating a vacuum, and the atmospheric pressure on the surface of the liquid forces the liquid up into the pressure source of the fluid. It has proved impossible to stop this back flow of a liquid with check valves because the movement of the liquid is so gradual that it will not actuate a check valve, but will creep past the same. As a specific example of such operations, it is old to fertilize irrigated land by connecting a pressure vessel containing anhydrous ammonia to a pipe containing a pressure regulator and inserting the end of the pipe into the water flowing through the irrigation ditch below the surface of the water, to flow the ammonia from the pressure container at a constant reduced pressure into the water below the surface thereof so that it will be absorbed in the water. The ammonia containing water then serves a dual purpose of irrigating and fertilizing at the same time as it is led over the land to be irrigated. The container for the ammonia is a large steel bottle which the farmer purchases but which must be returned to the supplier of the ammonia for economic reasons, to be recharged and used again. The farmer is a very busy man and oftentimes when the ammonia container becomes completely discharged he is somewhere else on the farm and cannot return in time to prevent the water absorbing the ammonia and being driven by atmospheric pressure back through the regulator into the container. While the container should be returned promptly, the farmer is so busy that it may be several weeks before the container gets back to the supplier of ammonia. During this time the water contents of the ammonia container along with such mud and other materials suspended in the water may well ruin the container, and also there may be freight charges for transportation of this unwanted water. Such a situation is undesirable both from the point of view of the farmer and the supplier of the ammonia, and the present invention is designed to obviate this backflow of water into such containers.

The present invention avoids the difficulties of the prior art by incorporating in combination with the pressure regulator of such a system a vacuum breaker, known as a vacuum relief valve, which positively prevents water from entering the ammonia container. This invention has application in all other fields in which any fluid from a pressure source of the same is dispensed into a stream of liquid in which it is soluble below the surface of said liquid, and constitutes a new process for doing the same. This invention also provides a novel system for practicing this process, and a very efficient and novel type of valve for use in such systems has been devised.

One object of this invention is to provide a novel process for dispensing a fluid from a pressure source of the same into the stream of liquid in which it is soluble below the surface of said liquid.

Another object is to provide a novel system for dispensing the fluid from a pressure source of the same into a stream of liquid in which it is soluble below the surface of the liquid.

Another object is to provide a novel valve for dispensing fluid.

Another object of this invention is to provide a pressure regulating valve in combination with a vacuum relief valve. Numerous other objects and advantages will be apparent to those skilled in the art upon reading the accompanying specification, claims and drawings.

Figure 2:
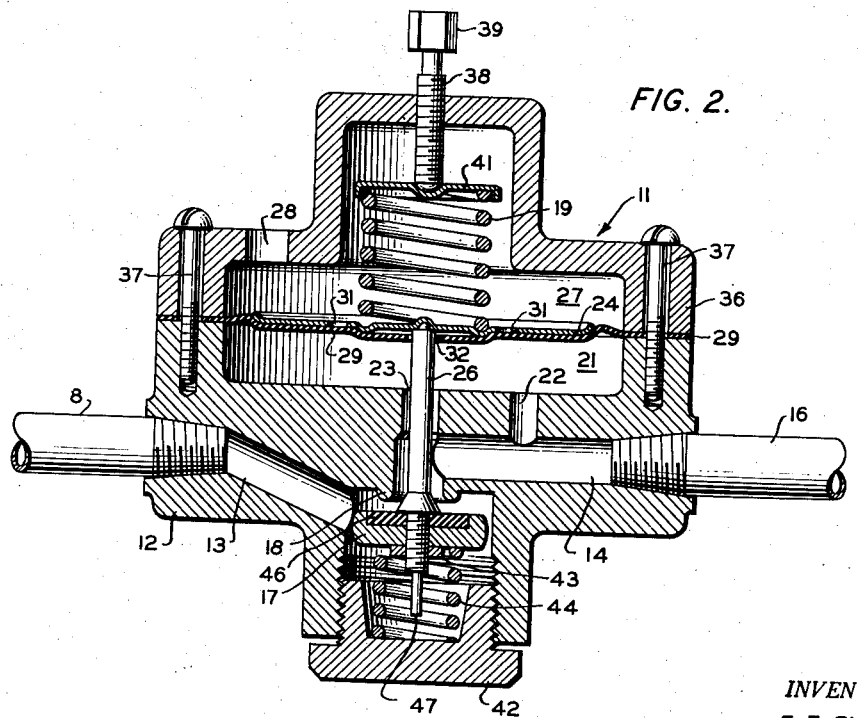

Figure 1 in the drawing is an elevational view of a system embodying the present invention. Figure 2 is an enlarged cross sectional view of the combination regulating valve and vacuum breaker 11 as shown in Figure 1. Figures 3, 4, 5 and 6 are modified forms of plate 24 and diaphragm 29 in Figure 2. Figure 7 is a view of a distributor for the end 34 of pipe 16 of Figure 1.

In Figure 1 is shown a container 1 which may be a conventional steel bottle for any fluid soluble in liquid 2. Container 1 is shown containing a liquid 3 over the surface 4 of which vapors 6 of said liquid 3 readily form if 3 is a liquid having a high vapor pressure. If it is desired to supplement the vapor pressure of liquid 3, or if liquid 3 has substantially insufficient vapor pressure or no vapor pressure, the space 6 may be filled with a compressed inert gas at a pressure sufficient to drive liquid 3 from container 1. Another means of supplying pressure in space 6 would be to float a layer of a liquid (not shown) immiscible with liquid 3, having a high vapor pressure but less density than liquid 3, on the surface of liquid 3 and employ the vapor pressure of said immiscible liquid having the high vapor pressure above the same in the upper part of space 6 to provide energy to force liquid 3 out of the container.

All of the expedients mentioned so far relative to liquid 3 are to be employed when liquid withdrawal of liquid 3 is desired, and to permit such liquid withdrawal a dip tube 7 extends down into the bottom of container 1, up which the liquid 3 may be forced into conduit 8.

However, when liquid 3 is a liquid with a high vapor pressure, and it is desired to have vapor withdrawal, dip tube 7 is eliminated and the vapors evaporating from liquid 3 and passing from container 1 go directly into conduit 8 instead of passing first through conduit 7 into conduit 8. Liquid 3 then remains in container 1 as it evaporates and only its vapors, or gas, pass out through line 8 until the liquid 3 is all evaporated.

In speaking of a fluid under pressure in container 1, it is intended to include gases, as in some cases container 1 may contain only a gas under high pressure at 6, in which case there is no liquid 3 and no interface 4 at all in container 1. In such a case, where the soluble fluid in container 1 is only a compressed gas such as nitrogen dioxide or sulfur dioxide, it makes little difference whether dip tube 7 is present or not, as the compressed gas will pass as a gas as readily through pipes 7 and 8 as through pipe 8 alone.

In one specific embodiment of the invention substantially anhydrous ammonia is supplied under pressure in container 1, and it may be in the form of compressed gas, but preferable it is in the form of a liquid 3. The vapor pressure of said anhydrous ammonia alone is sufficient, so that either liquid withdrawal can be obtained by ammonia vapor 6 from the ammonia forcing the liquid ammonia up dip tube 7, or if desired dip tube 7 can be eliminated and the ammonia vapors coming from liquid ammonia as vapor 6 can pass directly into conduit 8 for vapor withdrawal. If the ammonia is merely in the form of a compressed gas it will pass out line 8 whether dip tube 7 is present or not.

As the fluid passing in conduit 8 may be either liquid, or vapor, or a mixture of the two, it will in the remainder of the specification be referred to as fluid, with the intent to cover liquids, vapors, permanent gases and any combination of them.

The flow of fluid through conduit 8 may be controlled by a shutoff valve 9 interposed in said conduit. In some instances, when the vapor pressure in container 1 is not too great, the invention can be practiced without having any valve 9 in conduit 8 by quick attachment of conduit 8 to container 1 after removal of the cap or other sealing means that may be provided to seal container 1, but this is not recommended with ammonia or other high pressure fluids. However, container 1 generally comes equipped with a shutoff valve to seal the contents in the container which valve can be regarded as the same valve 9 shown in the drawing. Figure 2 will now be described below:

In order to control the flow of fluid through conduit 8 in the practice of the present invention, it is necessary to have a combined pressure regulating valve and vacuum relief valve generally designated as 11 attached thereto.

Said pressure regulating valve comprises in combination a casing 12 having an inlet conduit 13 connected to conduit 8 and an outlet conduit 14 connected to dispensing line 16. Said pressure regulating valve has a valve head 17 moving to and from a valve seat 18 controlling fluid flow through said inlet conduit. Helical compression spring 19 provides means biasing said valve open, although of course it is understood that a weight could be used instead as the means of biasing said valve open instead of spring 19.

A fluid motor 21 is provided in communication with said outlet conduit through passages 22 and/or 23, said fluid motor having a moving part 24 operatively connected to said valve head 17 by pressure on valve stem 26, said moving part being responsive to a predetermined positive pressure in motor 21 relative to atmospheric pressure in chamber 27 which communicates with the atmosphere through the large passage 28 to overcome the bias of spring 19 and move and close said valve head 17 on said seat 18.

At the same time a vacuum relief valve is provided comprising flexible diaphragm 29, which acts as a flexible valve head sealing passage 31 in place 24 and thereby controls communication between the atmosphere and said outlet conduit 14 through conduit 28, chamber 27, passage 31 in plate 24, a perforation 32 in diaphragm 29, motor 21 and passage 22. This vacuum relief valve is responsive to a predetermined negative pressure in said outlet conduit 14 relative to the atmospheric pressure in conduit 28 and chamber 27 to open said communication between said outlet conduit at said point and the atmosphere, as set forth above.

The dispensing conduit 16 is extended under the surface 33 of liquid 2 to discharge the fluid from container 1 into the body of liquid 2 in such a manner that it will dissolve therein.

While not at all necessary to the practice of this invention, if desired a shutoff valve 35 may be employed in line 16 to some advantage whether valve 9 is inserted in conduit 8 or not. Obviously it is less advantageous to have valve 35 in line 16 when there is a valve 9 in conduit 8, but it should be understood that both valves 9 and 35, or either one of them, can be completely eliminated from their respective conduits 8 and 16 and still practice the present invention to considerable advantage in actual commercial use of the same.

Returning to the details of regulating valve 11, for purpose of assembly it is convenient to make the body of valve 11 in two parts 12 and 36, secured together by suitable fastening means, such as screws 37, the flexible diaphragm 29 being secured therebetween.

It should be understood that in place of flexible diaphragm 29 a piston (not shown) having a central perforated portion to correspond to perforations 32 and suitable sealing means for sealing against the interior side walls of chamber 21 could be employed, and this piston, (not shown) could be inflexible and still move up to seal passages 31 under the pressure of gas in chamber 21. However, such construction is not preferred, it being preferred instead to use flexible diaphragm 29 as shown.

While spring 19 could press directly against the top of half of the body 36, it is desirable to provide means for regulating the compression of the spring since this is done by providing a bolt 38 threaded into the top of 36 and movable in and out by helical rotation, suitable wrench flats 39 being provided on the bolt for this purpose. While the end of bolt 38 could contact spring 19 directly, it is preferred to employ a plate 41 intermediate 38 and 19.

The other end of spring 19 presses against plate 24 which is provided with perforations 31. In place of perforations 31 it would be equivalent to have radial grooves (not shown) extending in as far as 31 from the edge of plate 24, the grooves being on the bottom of plate 24 and so deep that diaphragm 29 would not be flexible enough to extend up into them entirely. Another equivalent would be to have radial slots (not shown) in plate 24 extending in as far as perforations 31. To cover these equivalents, 31 may be designated as a passage in plate 24. (Figures 3 to 6 show how to avoid passage 31 entirely.)

Valve stem 26 extends up through perforation 32 in diaphragm 29 into engagement with plate 24. Stem 26 could be made integral with plate 24 if desired but this is not necessary, as spring 19, or the weight or weights which could be substituted therefor (weights not shown) will keep plate 24 engaged with stem 26 at all times. By changing the number of such weights (not shown) the bias on valve stem 26 may be varied as is done by screwing bolt 38 in or out.

For purposes of easy assembly, it is preferred to have a screw cap 42 screwed into the lower body portion 12 providing access to valve head 17. Valve head 17 could be made integral with valve stem 26 but it is preferably separable therefrom, and there is a threaded and shouldered portion on stem 26, secured to the valve head by a nut 43. As valve stem 26 is not shown integral with plate 24, it will not move upward when diaphragm 29 moves plate 24 up, compressing spring 19 in response to pressure in chamber 21. Therefore it is necessary to provide a helical compression spring 44, or other biasing means (not shown) above or below valve 17 to move the same up to follow plate 24, although said spring 44 may be eliminated by making valve stem 26 integral with, or secured to, plate 24. Valve 17 may be entirely metal and still seal on seat 18, but it is preferred to employ a usual soft, or flexible, gasket or valve seat insert 46 in valve head 17 as shown.

Valve stem 26 is provided with a stop member 47 which engages cap 42 during downward movement of valve head 17 to stop the downward motion of the valve and through valve stem 26 prevent further downward movement of plate 24, thereby allowing diaphragm 29 to continue downward, opening up communication between chambers 21 and 27 through passage 31, when the regulator 11 is acting as a vacuum relief valve. Obviously instead of having member 47 on the bottom of stem 26 it could be provided as a collar on 26 which would come into contact with the bottom of chamber 21 and stop further downward movement, or other equivalent structure could be employed for the purpose.

The specific construction of diaphragm 29 and plate 24 as shown in Figure 2 gives excellent operation when diaphragm 29 is made of a high quality, quite light weight and very flexible material, especially when the pressure differences between chamber 21 and 27 are large during the discharge period of cylinder 1. Opening 22 may be omitted by having opening 23 of proper size, or opening 23 can fit stem 26 rather closely by enlarging opening 22 a corresponding amount. When it is desired to have a diaphragm of a heavier or less flexible material or one which will respond to smaller pressure changes than that shown in Figure 2, the alternative diaphragm and plate constructions of Figures 3 to 6 may be employed, that of Figure 3 being the most preferred.

In Figure 3 diaphragm 29A has been substituted for diaphragm 29 in Figure 2, and plate 24A has been substituted for plate 24 of Figure 2. The general combination and arrangement of parts is the same as in Figure 2 as will be seen from springs 19 and 44, housing 12 and holes 22 and 23. Seat 18 is the same as in Figure 2 but the valve head 17A which cooperates with seat 18 is somewhat different. It has an inset 46A much the same as ring 46 but the valve stem 26A has a stop at 51 in the form of a shoulder instead of having a stop 47 as shown in Figure 2. Shoulder 51 acts as a stop by contacting the body 12 around hole 23. Plate 24A does not have any opening such as 31 of Figure 2 but instead has a resilient valve seat 52 inserted therein. Diaphragm 29A has a central perforation provided with a valve lip, or nipple 53 mounted therein, providing an air passage around valve stem 26A and secured to the diaphragm 29A by a nut 54. Lip 53 seals against valve seat 52 with a relatively high pressure-to-area ratio. While not essential to the operation of Figure 3, it is preferred to have a plate 56 to back up the center of diaphragm 29A and keep the edges of the diaphragm away from the edges of plate 24A. Plate 56 is secured between nipple 53 and diaphragm 29A by nut 54.

Figure 4 shows an alternative method of securing the diaphragm 29A to a slightly different form of diaphragm plate 56B which corresponds generally to plate 56 in Figure 3. Diaphragm 29A, a dished washer of spring material 58 and plate 56B are held together by a tubular rivet 57 in place of the otherwise corresponding threaded nipple 53 and nut 54 of Figure 3.

Figure 5 shows how the combination between diaphragm 29, plate 24, spring 19 and stem 26 of Figure 2 can be made more sensitive to pressure changes by omitting passage 31 of Figure 2 and supplying plate 24C with a depending annular rim or valve lip 59, which increases the loading per unit area of the contact between diaphragm 29 and plate 24C.

Figure 6 shows how the structure of Figure 3 could be simplified and the number of parts to be carried in stock could be reduced by making the plate generally designated as 24D (which replaces plate 24A of Figure 3) in the form of a valve head 17D of the same shape and form as valve 17 by making washer 46D the same as washer 46 of Figure 2 and by making valve stem 26 of Figure 2 as a double-headed valve stem 26D in Figure 6. In order that valve stem 26D cannot be assembled wrong, a projection 47D at the upper end can be made to correspond to projection 47 of Figure 2, although 47D has no other function. Spring 19 acts in the same manner as in all the previous figures, plate 56 is secured to diaphragm 29A in the same way as in Figure 3 by nipple 53B and threaded nut 51, nipple 53B differing from nipple 53 by having an annular rim or valve seat 61 thereon, which further concentrates the pressure. The plate generally designated as plate 24D comprises a valve head 17D with a resilient washer 46D, 17D and 46D being exactly the same as parts 17 and 46 of Figure 2 except for the reversed position above valve lip 61 instead of below valve lip 18, and it is understood that on the bottom of valve stem 26D there is a similar valve head 17 with an insert 46 and that all parts not shown in Figure 6 are exactly as shown in Figure 2. Plate 24D is held on valve stem 26D by means of nut 43D.

While the process of the invention can be practiced, and the device can be built exactly as shown in Figure 1, an improved and more even distribution of the fluid emerging from outlet 34 of tube 16 in Figure 1 is obtained in Figure 7 by supplying the end of tube 16 with a spreader 62 comprising a horizontal tube 62 forming a T as shown with tube 16, or in the form of an L (not shown). Tube 62 is provided with a number of distributing holes 63 and the end or ends of the tube 62 can be closed by cap 64 if desired. While the horizontal portion 62 could be suspended in the liquid 2 below the surface 33 thereof or rest on the bottom of the irrigation ditch, it is preferable to provide the same with feet 66 which may be pointed at 67 if desired, and may be provided with stop members 68 to limit the penetration of legs 66 into the bottom of the irrigation ditch.

In Figure 7 is shown a replaceable fixed orifice 69 which may be used as the equivalent of valve 35 of Figure 2 if desired. When valve 35 is employed it can be a needle valve or other such adjustable valve which can be adjusted to provide a constant flow restriction in the nature of a variable orifice which can be set to a predetermined size. Similarly when the orifice 69 is substituted for valve 35 the orifice 69 can be made removable so that any predetermined size orifice can be employed and the size of the same changed by changing one plate 69 for another with a different size hole in the center thereof.

*Operation*

The system shown in Figure 1 is assembled as shown with the regulator 11 in the atmosphere and preferably with container 1 also in the atmosphere, although container 1 could be submerged. Valves 9 and 35, if either or both are present, are open, and fluid 3 flows out container 1 and conduit 8, regulator 11 and dispensing conduit 16 to emerge at 34 under the surface 33 of liquid 2. As pointed out, fluid 3 may be either a liquid or a gas, and if a liquid, may be withdrawn either as a vapor or a liquid from container 1. If a liquid withdrawal is employed, it is necessary to have a dip tube 7 communicating with conduit 8 and extending into the bottom of container 1, in which case the vapors from liquid 3 or another inert gas under pressure in 6 forces liquid 3 up into conduit 8 through dip tube 7. If vapor withdrawal is employed, dip tube 7 is shortened or eliminated and the vapor from liquid 3, or compressed gas in 6 constitutes said fluid flowing through conduits 8 and 16.

Whether the fluid in conduit 8 is a liquid or a gas, it is under superatmospheric pressure and enters through inlet 13, passing through valve seat 18 into outlet 14 whereupon the pressure of the same is communicated through opening 22 into chamber 21 against diaphragm 29 which is immediately blown up against plate 24 by any small superatmospheric pressure in chamber 21, where it is opposed only by the pressure of biasing spring 19 and atmosphere 27, thereupon moving plate 24 upward. The spring 44 then tends to close valve head 17 on seat 18, throttling the flow of fluid from inlet 13 to outlet 14 until the pressure in 21 on diaphragm 29 and plate 24 counterbalances the force of atmospheric pressure in chamber 27 plus the pressure of spring 19. This provides a constant pressure in outlet 14 and the fluid flows under this constant pressure through dispensing conduit 16 into stream of liquid 2 at point 34 below the surface 33 thereof.

It is understood that the fluid in dispensing conduit 16 is soluble in the liquid 2; for example, the fluid may be anhydrous ammonia and the liquid 2 may be water.

Therefore when container 1 has its pressure exhausted, and the fluid no longer emerges at 34, the water will enter pipe 16 at 34 and by dissolving the fluid therein will create a partial vacuum in conduit 16 and space 14 which will create an equal partial vacuum in space 21. When this occurs the atmospheric pressure on surface 33 of liquid 2 would force the same up pipe 16 through outlet 14, valve seat 18, inlet 13 and conduit 8 back into container 1, which would be very detrimental to the container. However, when a partial vacuum is created in conduit 16 it is communicated immediately to chamber 21 and the atmospheric pressure in chamber 27 plus the force of spring 19 forces valve head 46 downward compressing spring 44 until stop member 47 strikes cap 42, at which time said atmospheric pressure continues to force diaphragm 29 down although plate 24 and spring 19 cannot follow the diaphragm because they are supported by valve stem 26 and stop member 47 on the bottom of cap 42. At this time diaphragm 29 moves away from plate 24 allowing the atmosphere to come in through opening 28, chamber 27, passage 31, perforation 32, chamber 21, passage 22 and outlet 14 into conduit 16 where it provides atmospheric pressure on the top of the liquid 2 which is attempting to rise in conduit 16 under atmospheric pressure on surface 33. As soon as atmospheric pressure is established in conduit 16 above the liquid 2 trying to rise therein, the liquid 2 falls immediately in conduit 16 and will not rise again.

Figures 3 to 6 show modifications of Figure 2 which operate in exactly the same manner except that there is no flow through passage 31 because there is no passage 31 and the flow has to go around the edge of the plate 24A in Figure 3, 24A in Figure 4, 24C in Figure 5, and 24D in Figure 6.

While the dispensing of fluid 3 in liquid 2 has been shown by having a stream of liquid 2 flowing past the end 34 of pipe 16, obviously the dispensing could be done by providing relative movement by mounting container 1 and line 16 in a motor boat (not shown) and obtaining relative movement between liquid 2 and end 34 of pipe 16 by moving the end 34 of pipe 16 through liquid 2 instead of moving liquid 2 and thereby provide relative movement. Obviously the preferred form of the invention is to flow liquid 2 past the stationary equipment and thus obtain relative movement between liquid 2 and outlet 34.

Whenever the relative movement between liquid 2 and outlet 34 is substantially constant, the present invention provides a means for metering the fluid 3 into liquid 2 in a quite uniform manner because the more or less constant pressure established in chamber 14 by regulator 11 in combination with the somewhat constant resistance to flow which exists in line 16 whether any valve 35 or orifice 69 is provided or not, will result in a more or less uniform discharge through outlet 34, especially if the depth of water 2 over the top of outlet 34 at 33 remains fairly constant. The accuracy of this metering rate is increased by the addition of a more or less uniform metering orifice in the form of valve 35 of Figure 1, or orifice plate 69 of Figure 7, which restrictions 35 and 69 tend to make the metering less dependent on the depth of submergence of outlet 34 below liquid surface 33. It is sufficient for the purpose of metering fluid into liquid 2 for most purposes that the rate of addition should not vary by more than 10 per cent during the life of the contents of cylinder 1, and the present invention will provide such accuracy. Such accuracy is more than ample when fluid 3 is ammonia being added to irrigation water 2 for fertilizing purposes, or when liquid 3 is chlorine which is being added to water for drinking or for swimming pool sanitation.

While a specific embodiment of the present invention has been shown for illustrative purposes, it is obvious that this invention is not limited thereto.

Having described my invention, I claim:

1. A pressure regulating valve comprising in combination a body having an inlet and an outlet and a conduit connecting said inlet and outlet, a valve comprising a valve seat in said conduit, a valve head movable to and from said seat to close and open said valve and thereby control fluid flow through said conduit, stop means disposed to limit said opening movement of said valve head, said body having a chamber communicating with said conduit on the outlet side of said seat, said chamber also communicating with the atmosphere, a plate in said chamber, said plate being operatively connected to said valve head, means biasing said valve head open, and a perforate flexible diaphragm separating said chamber into two portions, the first portion being that communicating with the atmosphere and the second portion that communicating with said conduit, said plate being in said first portion, said diaphragm being normally disposed by the gas pressure present in said second portion against said plate in a position sealing against the same but disposed to move away from said plate enough to allow gas to flow from said first portion around said plate and through the perforation in said diaphragm into said second portion when the pressure in said first portion is greater than the pressure in said second portion by a predetermined amount and said stop means limits the opening of said valve head.

2. The combination of claim 1 in which the means biasing said valve open is a helical compression spring operatively disposed between said body and said plate.

3. The combination of claim 2 in which the force of said compression spring can be varied by a screw threaded in said body and operatively engaging one end of said spring.

4. The combination of claim 3 in which a second compression spring operatively disposed between the valve head and said body biases said valve head toward said seat.

5. A system for dispensing a fluid beneath the surface of a liquid in which said fluid is soluble comprising in combination a container for a supply of said fluid under pressure, an outlet conduit connected at its inlet end to said container, the other outlet end of said outlet conduit being disposed for insertion under the surface of said liquid, a constant pressure regulating valve connected in said conduit and disposed and set to provide a constant predetermined pressure in said conduit downstream of said constant pressure regulating valve as long as at least said predetermined pressure remains in said container, and a vacuum relief valve connected in said conduit on the other side of said constant pressure regulating valve from said container constructed and disposed to open and cause the atmosphere to enter said other side of said conduit whenever the pressure therein is subatmospheric.

6. The combination of claim 5 in which a shut off valve is connected in said conduit between said container and said constant pressure regulating valve constructed and disposed to control the flow of fluid in said conduit.

7. The combination of claim 6 in which a second shut off valve is connected in said conduit between said constant pressure regulating valve and the outlet end of said conduit constructed and disposed to control the flow of fluid in said conduit.

8. The combination of claim 7 in which said second shut off valve is connected in said conduit between said vacuum relief valve and said outlet end of said conduit.

9. The combination of claim 5 in which a shut off valve is connected in said conduit between said constant pressure regulating valve and the outlet end of said conduit constructed and disposed to control the flow of fluid in said conduit.

10. The combination of claim 9 in which said shut off valve is connected in said conduit between said vacuum relief valve and said outlet end of said conduit.

11. The process of dispensing a fluid from a pressure source of the same into a liquid, comprising flowing said liquid in a stream, flowing said fluid through a conduit passing through the atmosphere into said liquid at a constant pressure and when said pressure source is exhausted establishing communication between said conduit and the atmosphere whereby atmospheric pressure is prevented from forcing said liquid into said source.

12. The process of claim 11 in which said fluid is substantially anhydrous ammonia and said liquid is water.

13. The combination of claim 5 in which a predetermined resistance to fluid flow is established in said outlet conduit to act in combination with said pressure regulator as a metering device metering said fluid.

14. The process of metering a fluid from a pressure source of the same into a stream of liquid in which it is soluble below the surface of said liquid at a point in relative motion with said stream of liquid comprising establishing substantially constant relative motion between said point and said liquid, flowing said fluid through a conduit passing through the atmosphere into said liquid at a constant pressure at said point, constantly restricting said flow of fluid by constantly resisting said flow, and when said pressure source is exhausted establishing communication between said conduit and the atmosphere whereby atmospheric pressure is prevented from forcing said liquid into said source.

References Cited in the file of this patent

UNITED STATES PATENTS

| Number | Name | Date |
|---|---|---|
| 2,017,879 | Wiechmann | Oct. 22, 1935 |
| 2,361,137 | Terry et al. | Oct. 24, 1944 |
| 2,603,231 | Birkemeier | July 15, 1952 |
| 2,607,364 | Smith | Aug. 19, 1952 |

FOREIGN PATENTS

| Number | Country | Date |
|---|---|---|
| 226,519 | Switzerland | July 1, 1943 |